Nov. 2, 1965   E. E. RHODES ETAL   3,214,954
ROLL DIE
Filed Feb. 19, 1963   11 Sheets-Sheet 1

EUGENE E. RHODES
ALVIN M. KURZ
INVENTORS

BY J.R. Faulkner
O.B. Johnson
ATTORNEYS

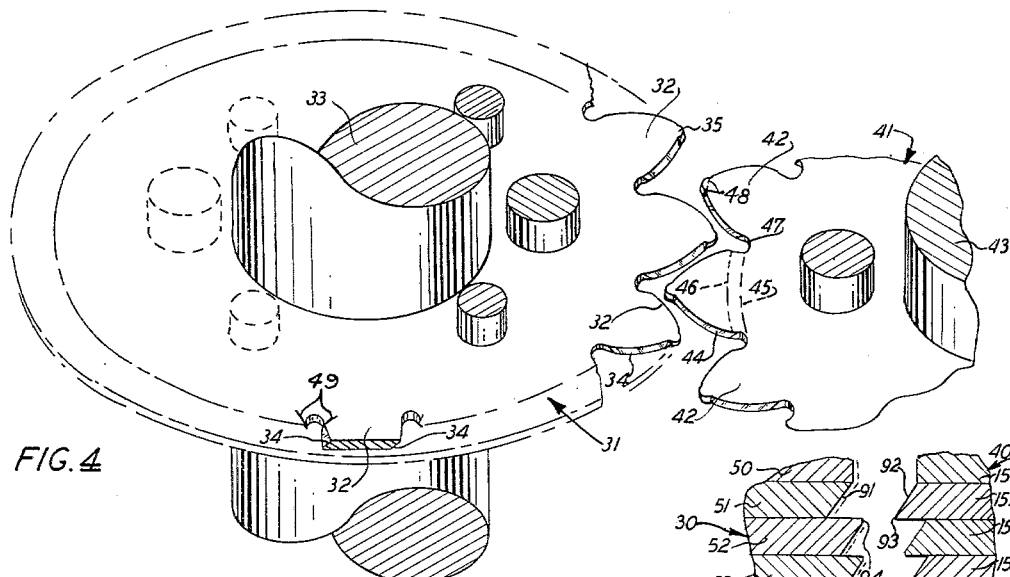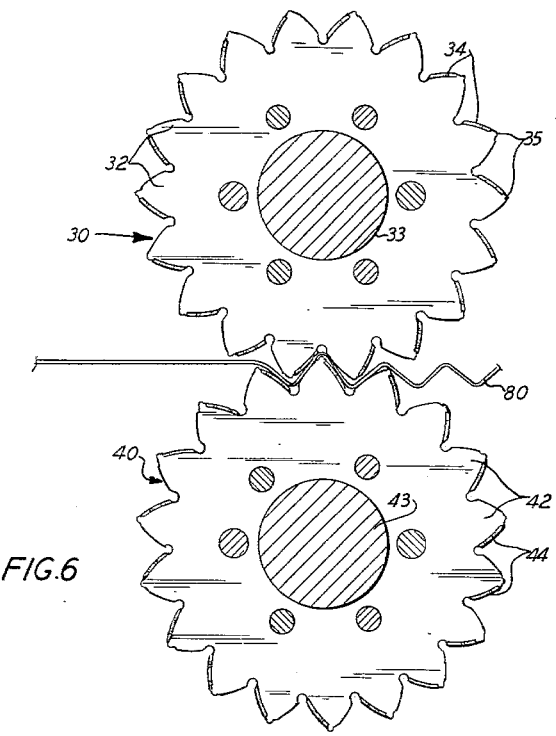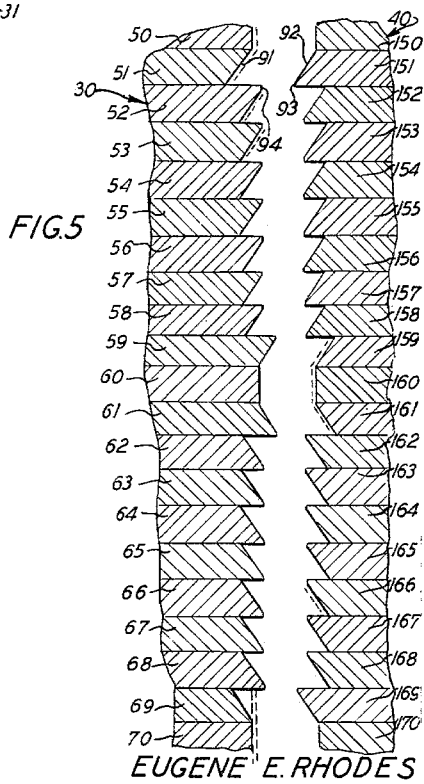

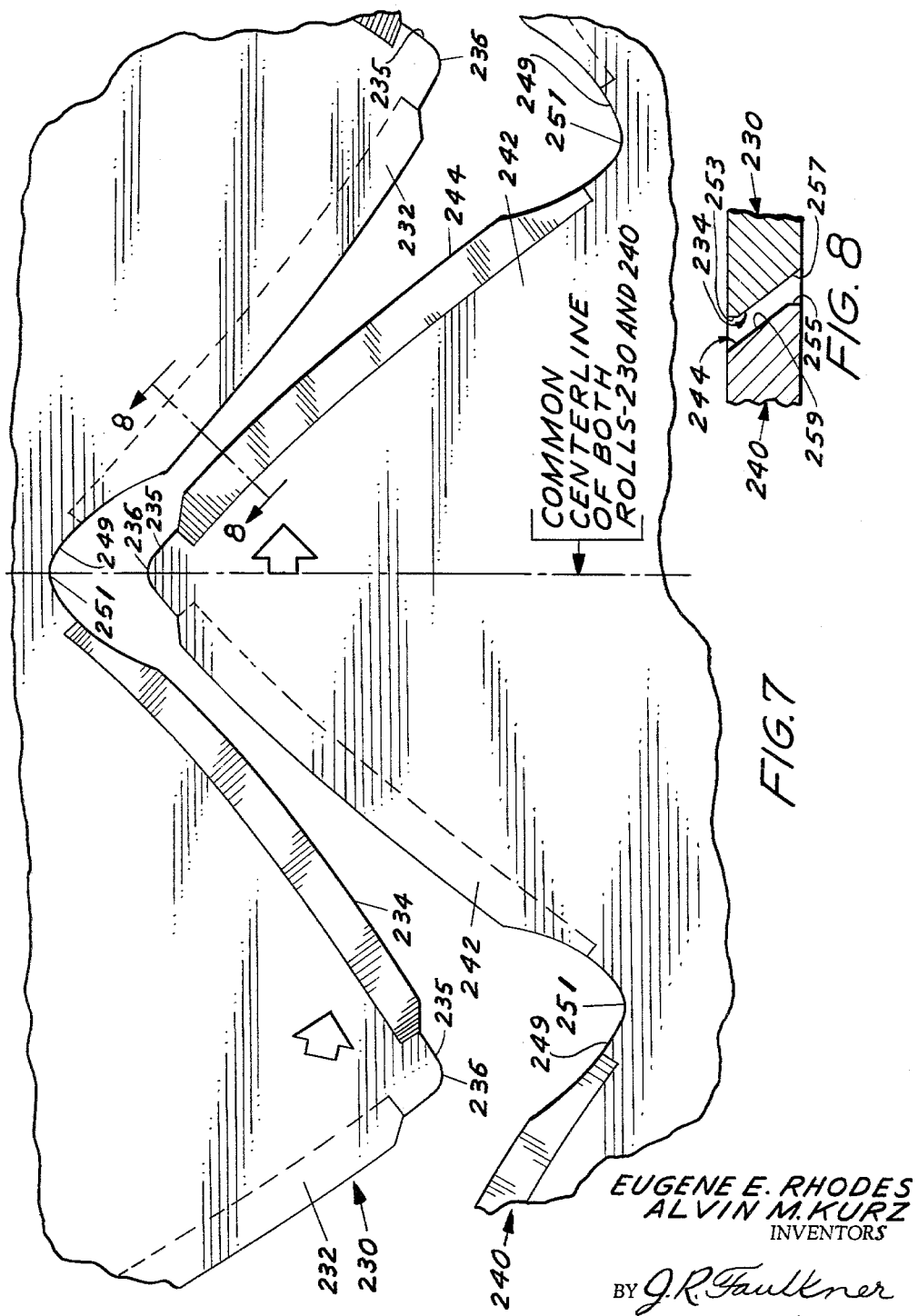

Nov. 2, 1965   E. E. RHODES ETAL   3,214,954
ROLL DIE
Filed Feb. 19, 1963   11 Sheets-Sheet 4

EUGENE E. RHODES
ALVIN M. KURZ
INVENTORS

BY J. R. Faulkner
O. B. Johnson

Nov. 2, 1965   E. E. RHODES ETAL   3,214,954
ROLL DIE
Filed Feb. 19, 1963   11 Sheets-Sheet 5
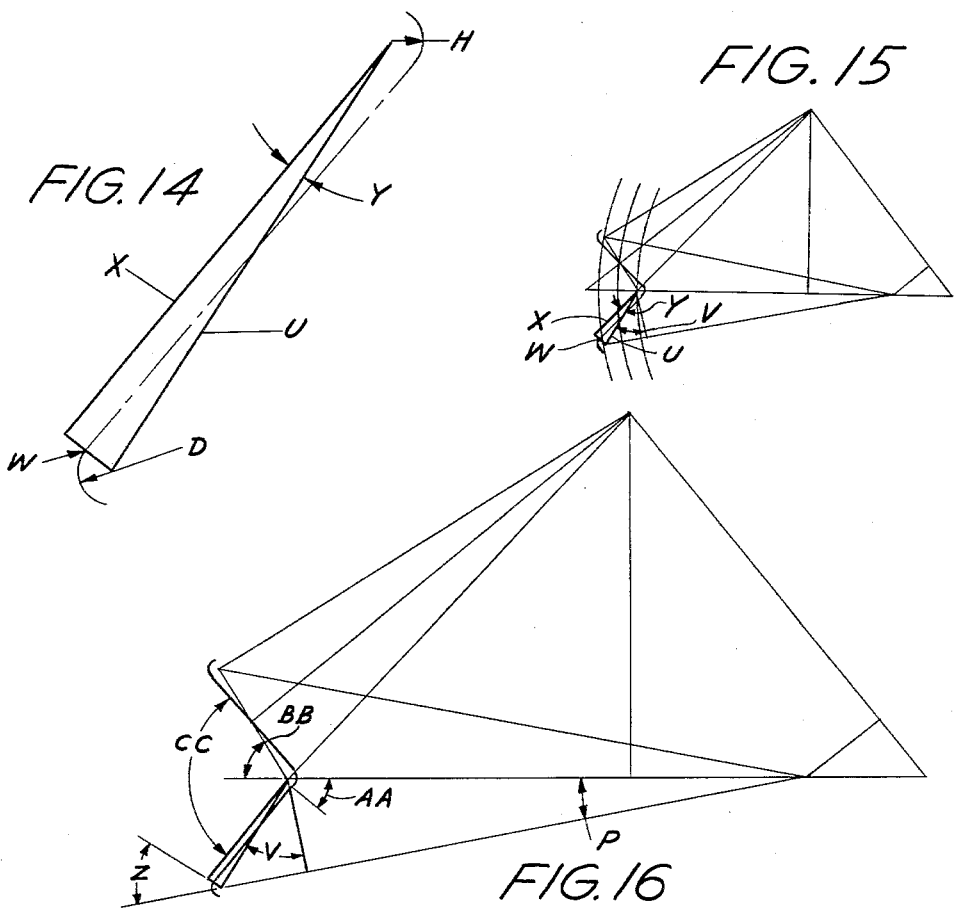
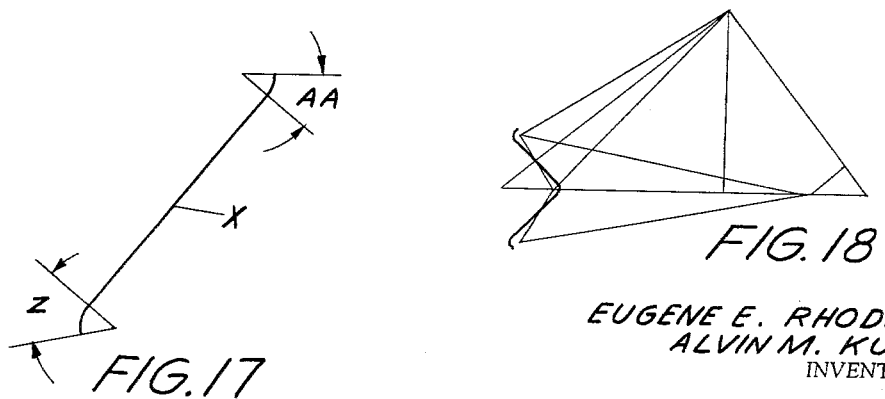
EUGENE E. RHODES
ALVIN M. KURZ
INVENTORS
BY J. R. Faulkner
O. B. Johnson
ATTORNEYS Nov. 2, 1965 E. E. RHODES ETAL 3,214,954
ROLL DIE
Filed Feb. 19, 1963 11 Sheets-Sheet 6
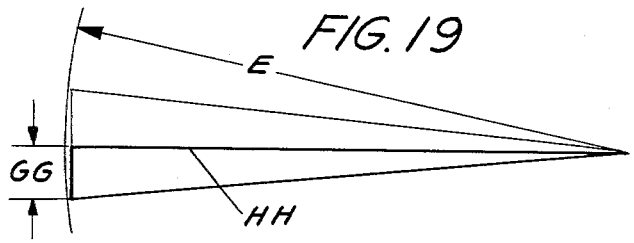
FIG. 19
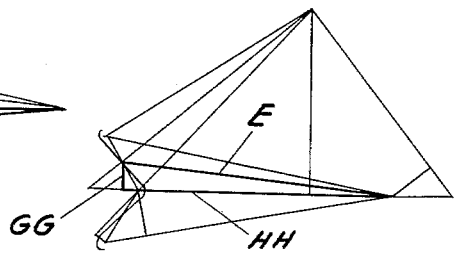
FIG. 20
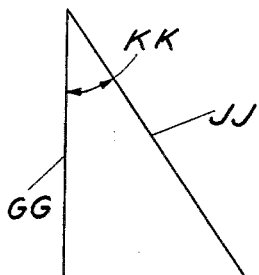
FIG. 21
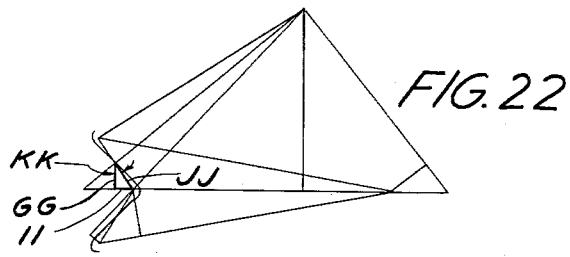
FIG. 22
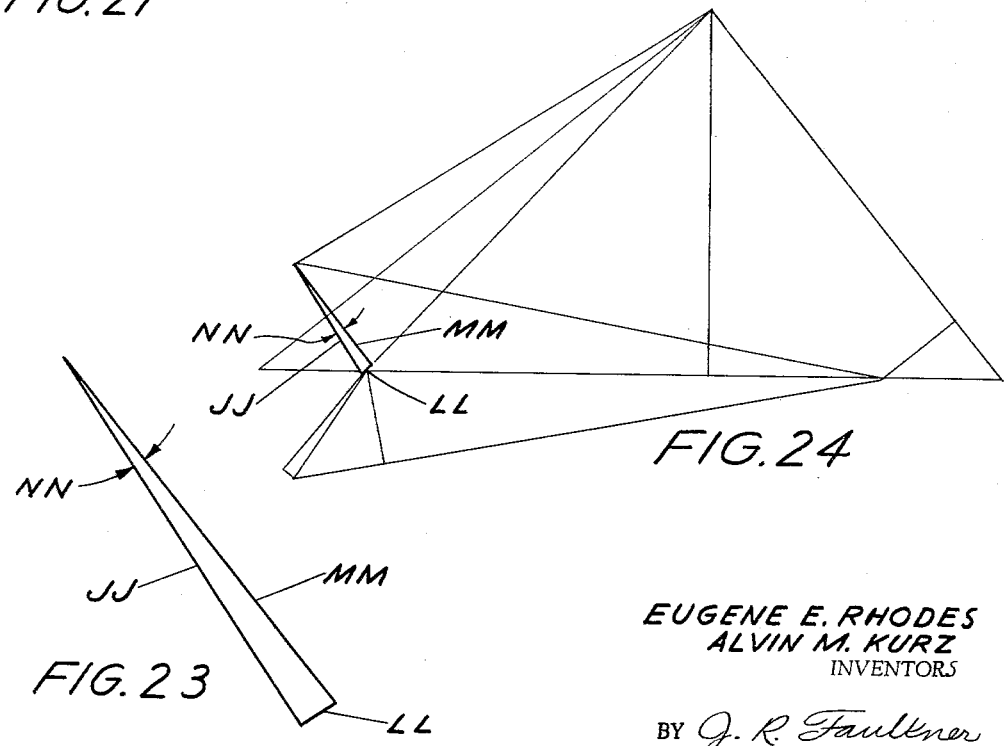
FIG. 23
FIG. 24
EUGENE E. RHODES
ALVIN M. KURZ
INVENTORS
BY J. R. Faulkner
O. B. Johnson
ATTORNEYS Nov. 2, 1965   E. E. RHODES ETAL   3,214,954
ROLL DIE
Filed Feb. 19, 1963   11 Sheets-Sheet 7
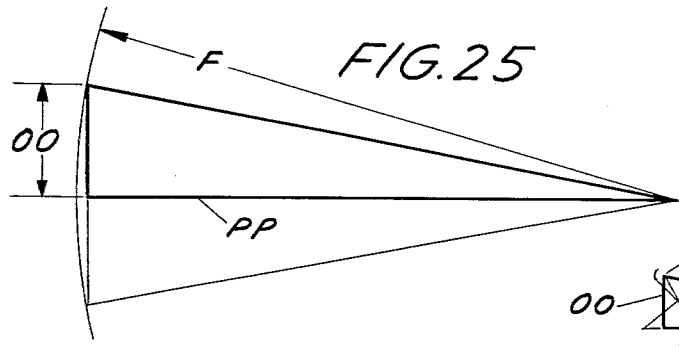
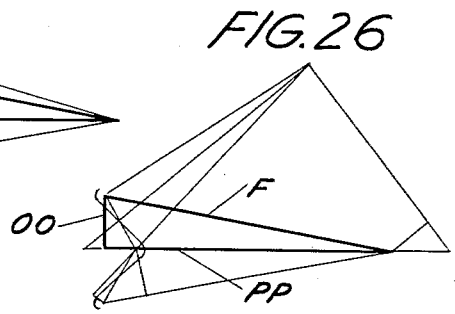
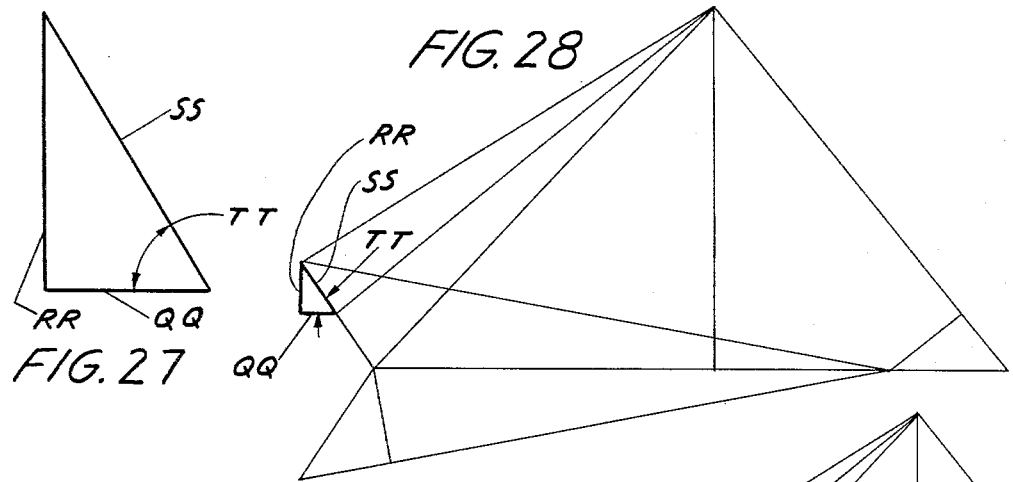
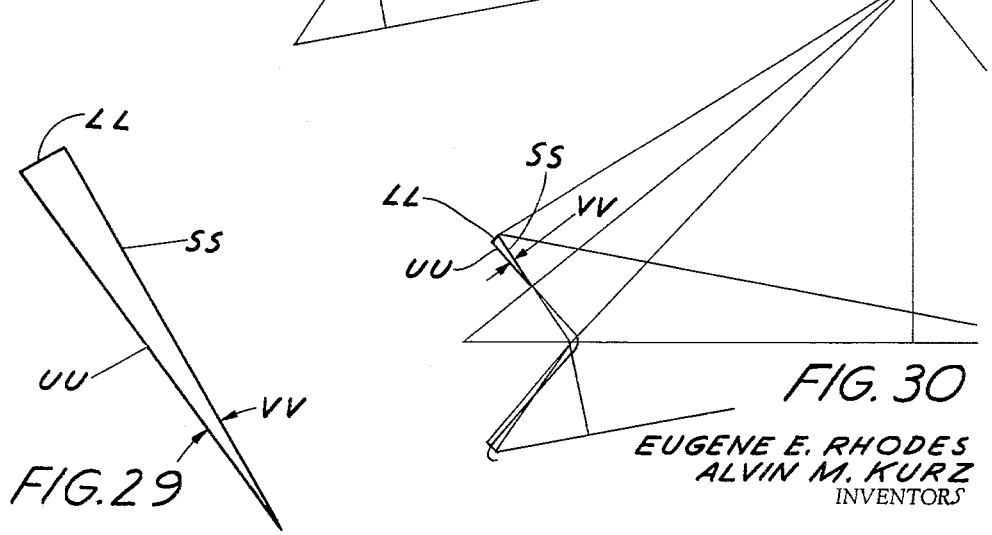
EUGENE E. RHODES
ALVIN M. KURZ
INVENTORS
BY J. R. Faulkner
O. B. Johnson
ATTORNEYS

EUGENE E. RHODES
ALVIN M. KURZ
INVENTORS

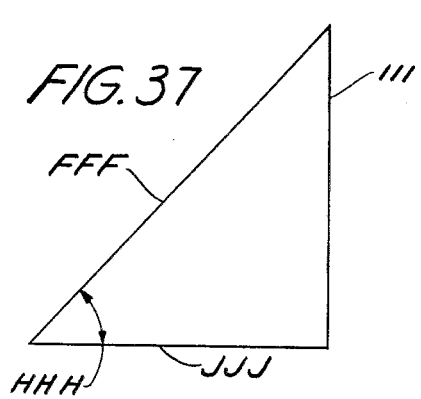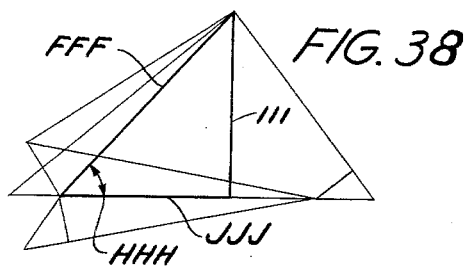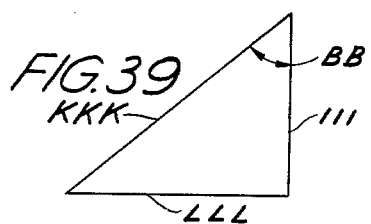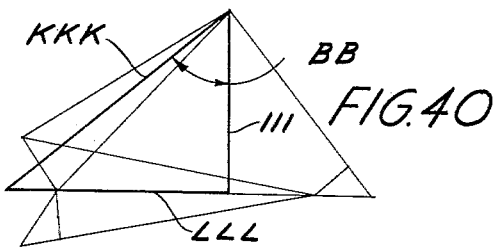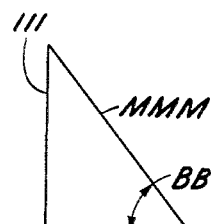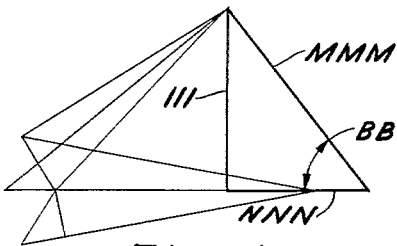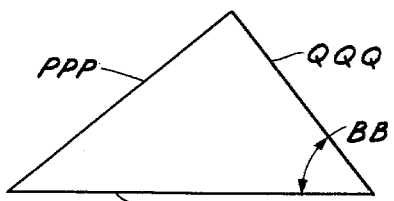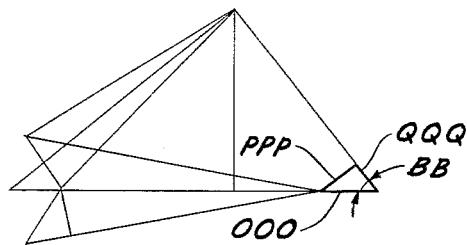

Nov. 2, 1965  E. E. RHODES ETAL  3,214,954
ROLL DIE
Filed Feb. 19, 1963  11 Sheets-Sheet 10

EUGENE E. RHODES
ALVIN M. KURZ
INVENTORS

BY J. R. Faulkner
O. B. Johnson
ATTORNEYS

Nov. 2, 1965   E. E. RHODES ETAL   3,214,954
ROLL DIE
Filed Feb. 19, 1963   11 Sheets-Sheet 11
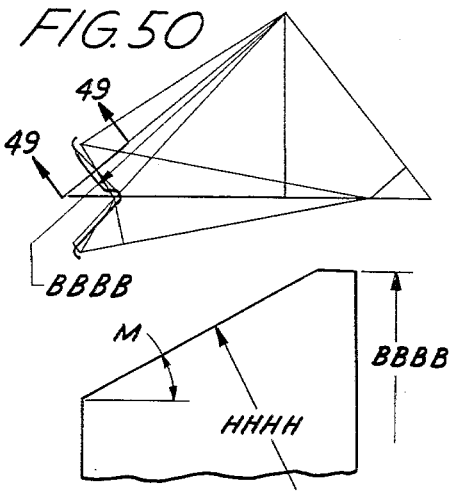
FIG. 50
FIG. 52
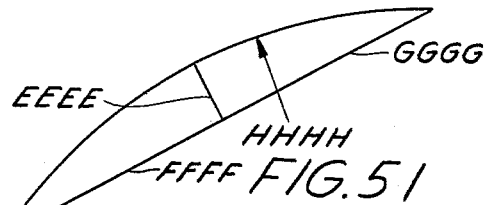
FIG. 51
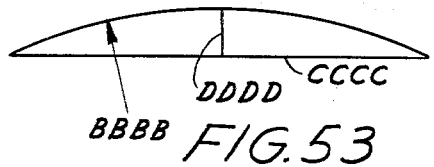
FIG. 53
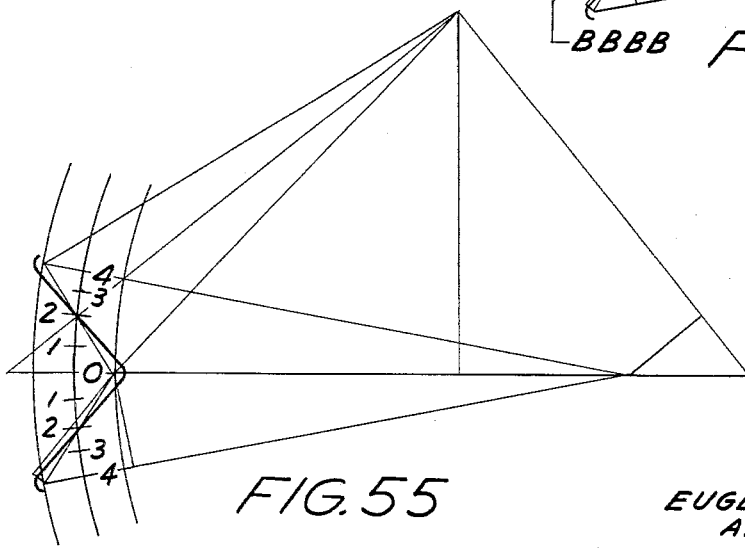
FIG. 54
FIG. 55
EUGENE E. RHODES
ALVIN M. KURZ
INVENTORS
BY J. R. Faulkner
O. B. Johnson
ATTORNEYS United States Patent Office 3,214,954
Patented Nov. 2, 1965

3,214,954
ROLL DIE
Eugene E. Rhodes, Belleville, and Alvin M. Kurz, Oak Park, Mich., assignors to Ford Motor Company, Dearborn, Mich., a corporation of Delaware
Filed Feb. 19, 1963, Ser. No. 259,547
9 Claims. (Cl. 72—332)

This invention relates to heat exchange devices and to apparatus and methods for the manufacture of the same. In particular, this invention relates to a novel heat exchange fin structure or spacer strip for use in a device wherein heat exchange is effected between a liquid and a gas, as, for example, in automobile radiators and heaters. Although the use of the fin structure here involved is not restricted to any particular field, it is especially adapted for use as a part of the main cooling system of an engine and will be so referred to for the purpose of disclosing the novel features embodied therein.

Although details of construction may vary, an engine cooling radiator ordinarily includes an inlet tank and an outlet tank for suitable connection with the water jacket of the engine, and a core or heat dissipating unit interposed between the two tanks for the travel of water in thin streams from one tank to the other through a number of spaced passageways or water tubes of suitable heat exchange material. Between each pair of these water conduits flows an air stream to take up or absorb heat carried by the water. A heat exchange fin structure and spacer element comprising a thin strip of a suitable metal or alloy, e.g. copper, brass, etc., is generally folded back and forth and interposed between the water tubes for cooperation therewith to divide the intervening space into a number of small air cells.

In this type of spacer strip the portion extending between folds or major corrugations will herein be referred to as the heat exchange fin, the fin proper or merely the fin.

It was early recognized that more efficient use could be made of the air flow between the water tubes if a greater proportion of the air stream is brought into direct contact with the metal of the spacer strip and/or the walls of the water tubes. This led to the incorporation of transverse serpentine corrugations to provide an undulating flow in the air passage through the individual cells. In other designs, openings have been provided in the fin proper to allow air to flow from one cell into another in its passage through the core. In modifications of this design louvers have been employed adjacent to such openings to divert air through such openings.

The louvered fins heretofore employed exhibit certain undesirable characteristics. Some of these are inadequacies of the basic design while others result from the methods and tools employed to form the intended design.

Design weaknesses include improper positioning, alignment and shaping of the louvers employed. This can reduce the efficiency of the entire cooling system by misdirecting or failing to direct the air flow. Maximizing the cooling efficiency of the core results from maximizing the wiping contact of the air on metal without undue impedance or resistance to flow. Too often in the past the value of laminar flow either has been overlooked or rejected in a misguided search for designs adapted to maximize turbulence. Furthermore, methods heretofore employed to form the design on the fin strip have resulted in uneven fin surfaces which impair the efficiency of the soldering process whereby the fin is made fast to the adjacent water tubes. This results in both inadequate connections and the plugging of air passages.

It is one object of this invention to provide an improved fin structure for use in a heat exchange device as hereinbefore described which will increase the heat absorption of an air stream passing through such device while reducing obstructions to such flow which do not contribute to heat exchange efficiency.

It is another object of this invention to provide an improved fin structure that will reduce losses in heat exchange efficiency that result from prolonged contact between air and the metal of such devices after a practical level of heat absorption has been reached.

It is another object of this invention to provide a novel roll type die for cutting and shaping improved heat exchange fin structures.

Many other objects and advantages of this invention will be obvious to those skilled in the art from the disclosure herein given:

In the drawings, wherein like reference characters indicate like or corresponding parts:

FIGURE 4 is a partial view in perspective showing in spaced apart relationship the cutting and forming edges of the involute teeth of mating gear-like blades or die sections from each of two die rolls between which strip stock is passed in accordance with this invention to form the vents and louvers of the fin proper and to initiate the folding of the fin strip between adjacent fins.

FIGURE 5 is an enlarged partial view in cross section of one embodiment of the die rolls of this invention showing in spaced apart relationship the alignment of teeth within each roll and with reference to the mating roll, and, in broken outline, representative displacement of strip stock by such teeth when in mesh.

FIGURE 6 is a reduced view in cross section of the die rolls taken at a 90° angle to the view shown in FIGURE 5 with the terminal sections removed to show two intermediate cutting and forming blades of the type shown in FIGURE 4 in operating position upon a strip stock.

FIGURE 7 is a greatly enlarged view of a small portion of two mating blades similar to those shown in FIGURE 4 but differing in that when in mesh a slight interference is provided whereby the strip stock is compressed providing controlled deformation at the midpoint between adjacent fins by the action of the corresponding tooth tip and root or clearance arc.

FIGURE 8 is a cross sectional view taken along line 8—8 of FIGURE 7.

FIGURES 9–55 inclusive illustrate procedural steps that can be used to layout and construct a cutting and forming blade in accordance with this invention.

Figure 1:
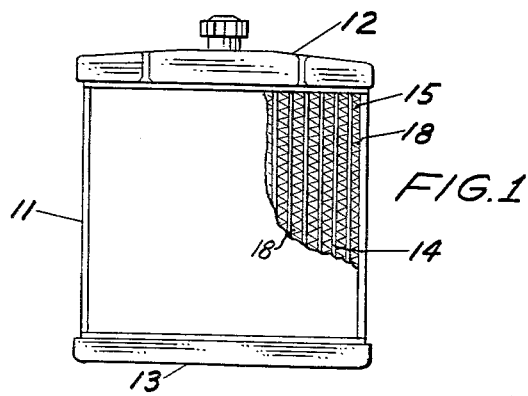
FIGURE 1 is a partially completed front view of an automobile radiator illustrating one use of the spacer strips or fin structures of this invention.
Figure 2:
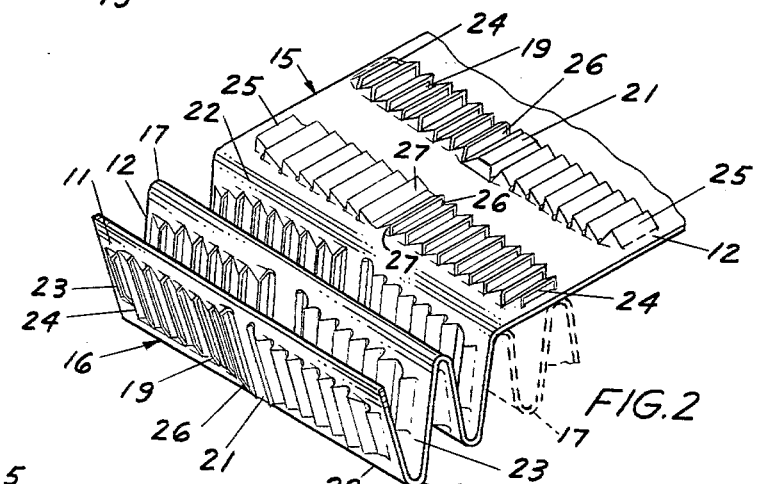
FIGURE 2 is a perspective view of a fin strip of this invention with portions thereof shown in the folded and unfolded state to illustrate the relationship of adjacent fins in the spacer strips of this invention.
Figure 3:
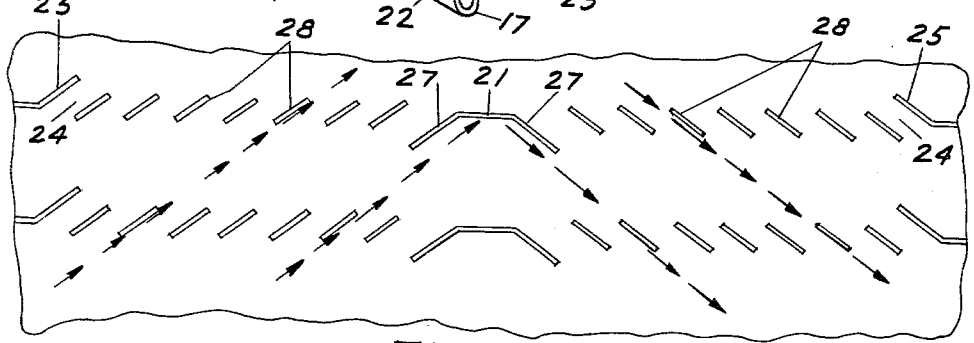
FIGURE 3 is a schematic view of two fins positioned on either side of an air cell and illustrating both the novel alignment and positioning of the fin louvers and representative paths of air particles passing therethrough.

Referring to FIGURES 1–3, the radiator assembly, as will be readily understood, includes a heat dissipating unit or core 11, having at opposite ends a top tank or inlet header 12, and a bottom tank or outlet header 13, adapted for connection, respectively with the discharge and intake conduits of a cylinder block cooling jacket. For the flow of cooling medium from one tank to the other the core is made up of a number of fluid passageways or water tubes 14, spaced apart by fin strips 15. The fin strip shown in the drawing is of folded or corrugated outline providing a series of fins 16 between folds or connecting members 17. The strips 15 therefore extend between adjacent walls to the adjoining tubes to divide the space into a number of relatively small air cells or conduits 18. Ordinarily, the opposite edges or front and rear faces of the core assembly are dipped first in a flux and then in molten solder to seal the margins of the walls of the water tubes where necessary and to join the fin strips to the walls. If the passageways and fin strips are evenly formed so as to make possible continuous contact from edge to edge, there will be an inward capillary flow of solder toward the center of the core, and a positive bond will result throughout substantially the entire depth of the core to insure the free flow of heat into the fins.

Attention is now directed to the novel design of the fin proper and specifically to FIGURES 2 and 3 of the drawings. Fin 16 is planar, i.e. a single plane can be passed simultaneously through the entire length of both the longitudinal and transverse axes. For purposes of convenience such plane is hereinafter referred to as the central plane or base plane.

Provided in the planar fin 16 are groups of parallel transverse slots 19, 24 and 26 through which air can pass from cell to cell. The slots 19 and the adjacent louvers are formed by slitting the planar fin and turning the interpositioned strips out of the central plane. Thus, in the embodiment shown the fin may be viewed as providing a pair of spaced apart louvered windows each of which provide a plurality of transverse openings between louvers which are aligned in parallel relationship with respect to the other louvers of the same window but inclined from the central plane of the fin at an equal and opposite angle from those of the next adjacent window. Although the fin of this embodiment provides only two of such windows it is to be understood that one or more additional windows may be provided in other embodiments with the same order of louver reversal with respect to adjacent windows.

The portion of the end supports adjacent the terminal slots 24 form outer diversion louvers 25 which are pivoted from their base so as to project outward from one side of the central or fin plane. The edges of central support 21 adjacent the central terminal slots 26 form inner or central diversion louvers 27. The term "terminal" herein is used with respect to a given window, i.e. grouping of louvers, and hence may or may not mean terminal with respect to the entire fin. Louvers 27 are also pivoted from their base so as to project from the central plane on the side opposite louvers 25. It will be noted that each of the outer diversion louvers 25 is aligned in parallel relationship with the nearest inner or central diversion louver 27 and that louvers 25 and 27 extend from opposite sides of the central or fin plane. While the projecting edges of each of the outer diversion louvers 25 is inclined toward the nearest central support and in a two window fin toward the center thereof, the projecting edge of each of the inner or central diversion louvers 27 is inclined toward the nearest outer diversion louver or away from the center of the fin. The remainder of the fin provides a central support 21, positioned between such windows, side supports 22 and end supports 23.

The strip between slots 19 and the strips beteween slots 19 and terminal slots 24 and 26 form intermediate louvers 28 each of which is turned out of the central plane by pivoting about its longitudinal axis so that louvers 28 extend out of the central plane in two opposing directions. However, it will be noted that louvers 28 extend from the central plane for a lesser distance on each side of the central plane than do the diversion louvers extending from the corresponding side. In addition to being aligned in parallel relationship with each other within each set, louvers 28 are also in parallel relationship with the diversion louvers 25 and 27 with which they are grouped.

Louvers 25, 27 and 28, except for the edges thereof where they are pivoted or twisted in relation to the supporting fin, are planar providing a smooth, flat surface along essentially their entire length and breadth. In this embodiment central support member 21 supports inner diversion louvers 27 and is substantially equal in width to each of the louvers 27. The major transverse measurement of such louvers is preferably as small as the method of manufacture and requirements of structural strength will permit. Such louvers en masse therefore present to an air stream the largest practical wiping surface coupled with the minimum of impedance to air flow commensurate with maximum heat exchange efficiency.

The diversion louvers 25 and 27 as aforementioned extend farther from the central plane than intermediate louvers 28. Terminal slots 24 are also somewhat larger than intermediate slots 19. Slots 24, louvers 25, and louvers 27 being located in terminal and central positions are thus properly shaped, sized and positioned to provide a primary diversion effect upon an air stream entering one of the cells 18, escaping into an adjoining cell and eventually passing out of the radiator on the side opposite from whence it entered. In cooperation with slots 19 and louvers 28 the wiping air is passed along the louver faces from cell to cell until the path of a representative particle of air is directed into contact with central support 21 from whence it is diverted by the inner diversion louver 27 that obstructs its original directional movement from cell to cell. This louver is aligned to divert the movement of the air particle toward a window of the adjoining fin opposite the window through which it passed before being diverted by louver 27 as illustrated in FIGURE 3.

The number, size, alignment and positioning of the louvers as herein disclosed provides an unexpected advance in the art making possible an important reduction in the metal requirements of a given unit as hereinafter demonstrated. In the embodiment shown each fin is about 1.27 inches in its longest measure and has a distance of about 1.17 inches between the bend lines of the outer louvers 25. This embodiment therefore provides a center support, two inner or central diversion louvers, 14 intermediate louvers and two outer diversion louvers a distance of 1.17 inches. In this type of fin there should be at least 12, and preferably 14 or more, louvers per inch of fin, measured along the longitudinal axis of the fin proper. It will be understood that such measurement is along a line transverse to the longitudinal measurement of the fin strip of which the individual fins form a part.

This fin is thus designed to increase laminar flow and permits the contact of a greater amount of unheated and lightly heated air to a greater area of unclogged heat exchange surface per unit of time or per air unit pass. The term clogging here relates to the phenomenon whereby a heat exchange surface is blanketed by a clinging film of air.

In FIGURES 4–6 inclusive there is shown a novel device for making regularly spaced impressions on a sheet material that will maintain a defined shape after cutting and forming, e.g. suitable metals, plastics, etc. It should be understood at the outset that although the embodiment here shown is designed specifically to produce heat exchange fin structures of the type hereinbefore described, this invention can be adapted to produce an almost endless variety of fin strip designs and is equally adaptable to provide a wide variety of other articles from sheet metal the production of which can be effected by the simultaneous cutting, forming, and shaping of repeated designs.

Referring now to FIGURE 4 there are shown a pair of gear-like cutting and forming blades 31 and 41 which have involute teeth 32 and 42 evenly spaced about their respective perimeters. In this view a cut-away portion of blade 41 is shown spaced apart from blade 31 of which only a portion of the perimeter is outlined in detail. Blades 31 and 41 are mounted on shafts 33 and 43 respectively.

Each of the teeth 32 and 42 provide two curved louver-forming faces 34 and 44 respectively. Such faces on a given tooth are separated by a tip portion indicated by number 35 on blade 31. The curves described by each of the louver-forming faces 34 and 44 are involutes of a noncircular evolute and are further characterized in that they describe arcs of equal circles. One of the teeth 32 is shown in cross section to show both of the louver-forming faces. It should be understood that the distinction often made in gear terminology between the "flank" and the "face" of a tooth is not used in this specification and hence the curved faces 34 and 44 shall be understood to extend both inside and outside the pitch circle.

A broken line on one of the teeth 42 indicates the root circle 45. On the same tooth the locus of the points of intersection of the louver-forming faces 44 with the corresponding fillets 47 is indicated in broken line at 46. Farther up the same tooth the locus of the points of intersection of the louver-forming faces 44 with the corresponding tip arcs is indicated in broken line at 48.

The fillet 47 is the small curve connecting the tooth profile with the bottom of the tooth space in accordance with conventional gear terminology and the adjoining fillets of adjacent teeth form an arc 49 herein termed the root or clearance arc.

The louver-forming faces 34 and 44 viewed transversely each have a narrow cutting edge at one side. From this the remainder of the face slopes inwardly or recedes to the opposite edge. The shape of the louver-forming faces of the blades of this invention are best illustrated in FIGURE 8 and will be more fully described in relation to that figure. As will be seen later in the description of FIGURE 5 this sloping surface and the corresponding surface of the mating tooth determines the angle at which the louver formed on a fin strip is inclined from the central plane of the fin. Thus, each of the involute louver-forming faces 34 and 44, for the greater part of its width, at any given point on the curve forms an acute angle with the transverse axis of the blade. Opposite portions of the two opposite louver-forming faces of a given tooth recede at equal rates. This pattern is repeated in the several teeth forming the perimeter of the blade.

For convenience of expression the term "working contact" is used herein to describe the relationship of one blade rolling upon its mate with the thin strip of sheet stock positioned therebetween. Each involute face or surface is therefore adapted to mesh with and roll upon the mating faces of the mating blade, i.e. in edge-to-edge working contact, and to maintain transverse line contact continuously from initiation of such contact between a given pair of mated faces until termination of the same.

The length, width and slope of the louver-forming surfaces 34 and 44 of the mating blades govern the size of the openings made in the sheet stock and the accompanying displacement of adjacent material. This displaced material becomes the louvers of the fin. The scissor-like cutting action requires a third surface in addition to the mating blades. This is ordinarily supplied by another blade in parallel relationship with the mating pair of blades as shown in FIGURE 5.

In FIGURE 5 there is shown a portion of two gear-like die assemblies, i.e. cutting and forming rolls, 30 and 40, made up from a plurality of plate-like, circular blades the majority of which are formed in like manner to the blades shown in FIGURE 4. The blades of each roll are mounted in parallel relationship upon a central shaft, not shown in FIGURE 5 but illustrated with the single blades in FIGURE 4. In this embodiment the blades employed are arranged in the manner necessary to produce the novel fin structures hereinbefore described. In FIGURE 5, the blades or gear wheels are shown in cross section to illustrate transverse profile of the teeth and their mating relationship with the corresponding surface of the mating roll. In each such roll in this particular embodiment there are shown the terminal ends of eighteen angle faced or forming blades of the type described with reference to FIGURE 4 and the corresponding parts of three other gear wheels or flat faced blades the working surfaces of which are parallel to the transverse axis thereof.

In roll die 30 the working faces of sections 50, 60 and 70 are parallel to the transverse axis of their respective blades. Otherwise these sections or blades bear the same involute teeth as the blades hereinbefore described. Sections 150, 160 and 170 form the mating or corresponding parts of roll die 40. Terminal sections or gear wheels 50, 70, 150 and 170 provide an ironing effect upon an external portion of the sheet stock adjacent the terminal louvers and form the neutral line for stock passing between such rolls. The formation of the slots and louvers hereinbefore described is carried out in two operational steps when rolls 30 and 40 are engaged in normal operating relationship and a strip of sheet stock is passed between the power driven rolls as illustrated in FIGURE 6. For example, the formation of one terminal louver is effected by the cooperative action of blades 51, 52 and 151. Before the corresponding parts of faces 91 and 92 of blades 51 and 151 can be rotated into contact with each other the leading or cutting edge 93 of blade 151 must pass in close parallel relationship with the leading edge 94 of blade 52 thereby shearing or cutting the sheet stock in a scissor-like action. Since this rolling working contact is made for the length of a given contact path of one side of a given tooth, the cut made will be essentially the length of the path of contact, the involute. The continued movement which brings face 92 into rolling contact with face 91 along the entire path of working contact of the given louver-forming faces also presses that portion of the sheet stock in front of face 92 from the neutral line and against face 91 so as to assume the position shown in dotted line along face 91. The rolling action of faces 91 and 92 with strip material between them produces an ironing effect upon the resulting louver giving to the latter a smooth straight surface.

Adjoining louvers are formed by blades 52-59 and blades 152-159 inclusive but with the difference that the formation of each of these louvers involves making two cuts in the sheet material freeing the louver from support at two sides. The strip forming such louver is pivoted about its longitudinal axis to extend out of a plane passing through the neutral line in two directions in contrast to the single displacement of the terminal or outer diversion louver, e.g. one side of a strip follows the cutting edge of blade 52 to the receding edge of 152 while the opposite side is pressed out of the neutral line by the cutting edge of 152 and comes to rest upon the receding edge of 52. Here again the rolling action provides an ironing effect upon the resulting louver. This novel effect is made possible because a line contact, transverse to the rotational axes of the mating blades, is maintained throughout the path of contact.

Centrally positioned blades 59, 61, 159 and 161 cooperate with center sections or gear wheels 60 and 160 in like manner to form a trough like structure having a center section and two dependent louvers as shown in FIGURES 2 and 3 and identified by numerals 21 and 27.

Blades 61-69 and 161-169 inclusive are in reverse alignment to blades 51-59 and 151-159 but operate in like manner providing louvers inclined in accordance with their alignment.

In FIGURE 6 a side view of die rolls 30 and 40 in operating position illustrates the crimping or pleating of a sheet metal stock 80 which also occurs as the latter is passed between the cutting and forming blades as hereinbefore described.

The fin forming operation initiates the folding of the fin strip between adjacent fins. Ordinarily this folding will be completed by a gathering device, not shown. Such devices are conventional tools in this art and do not comprise a part of this invention.

In the embodiment shown in FIGURES 4 through 6 inclusive the rolls are spaced so that the clearance therebetween is essentially the same as the thickness of the sheet material being processed throughout the working contact path.

A preferred embodiment is illustrated in FIGURE 7. In FIGURE 7 a small portion of the perimeters of blades 230 and 240 is shown greatly enlarged. Blades 230 and 240 have teeth 232 and 242 respectively. These teeth are provided with louver-forming involute faces 234 and 244 respectively. Both blades have tooth tips 235 and root or clearance arcs 249. However, the blades in this embodiment are designed to provide a slight clearance interference in that the shortest distance between the high point or transverse bisector 236 of tips 235 and the low point or transverse bisector 251 of root arcs 249 is slightly less than the clearance between the involute louver-forming faces 234 and 244 and slightly less than the thickness of the strip stock. Thus, in one embodiment where the thickness of the strip stock is .003 inch the clearance between the louver-forming faces is .003 inch while the shortest distance between the fold-forming tip and root arc combination is about .0025 inch. This causes a slight compression and deformation of the strip stock at the bend between fins and provides a particularly effective fold.

The cross sectional view in FIGURE 8 is also enlarged to better illustrate the shape of the louver-forming faces 234 and 244. Here, these involute faces clearly show cutting edges 253 and 255 respectively which are parallel with the transverse axis of their respective blades and sloped forming edges 257 and 259 respectively which form an acute angle with the same.

It is to be seen that such device provides a novel ironing effect made possible by the involute shape of the louver-forming surfaces and the cooperative action of the tooth tips with the surfaces of the root arcs. This not only provides smooth regular surfaces on the finished product in general but also makes possible the formation of straight or planar louvers, i.e. louvers which except for their twisted ends are flat sheets.

The advantages of the heat exchange fin structures of this invention will be more fully understood from the following operative examples which should be considered as illustrative and not as limitations upon the true scope of the invention as set forth in the claims.

EXAMPLE I

A gear-like blade of the type hereinbefore described and illustrated in FIGURES 4 through 6 inclusive was prepared for use in a roll die of the type also hereinafter described and illustrated in FIGURES 5 and 6. In particular, the blade, the preparation of which will now be described, corresponded to those of the illustrated blades in FIGURES 4 through 6 inclusive on which the curved louver-forming surfaces are shaped so as to form an acute angle with the transverse axis of the blade upon which they are situated. The more easily prepared gear-like forming blades or sections, e.g. blade 60 of FIGURE 5, are prepared in like manner except that the working face is left or made parallel to the transverse axis of the wheel.

The detailed description of the preparation of this blade will be more easily understood by referring to FIGURES 9 through 56 inclusive of the accompanying drawings.

In this instance it was decided to prepare a blade for use in one of a pair of roll dies adapted for use in producing a fin strip having a fin fold radius of .020 inch and a developed fin length of .545 inch. The term "fin fold radius" is used herein to define the curvature of the curved portion or connecting member of the fin strip extending between each adjacent pair of planar fins and identified by numeral 17 in FIGURE 2. More particularly, this term identifies the curvature of this connecting portion or member by referring to an imaginary circle of which such curved portion forms an arc thereof. The radius of such circle is therefore herein termed the "fin fold radius" and is equivalent to the "tooth tip radius" or "tip arc radius" of the blade. Rotation of the tooth tip radius describes the "tooth tip arc." The point between adjacent teeth nearest the center of the blade constitutes the midpoint of the "root arc" or "clearance arc." The root arc radius is equal to the tip arc radius plus allowance for the thickness of the strip stock. The formation of each of the folds between fins is initiated by the cooperation of a given tooth tip and the surface of a given root arc of the mating blade. The term "developed fin length" as employed herein refers to the distance from the midpoint of one curved connecting member to the midpoint of the next as measured along the surface of the fin strip with conventional adjustment for bend radius.

Preparation of the blade also took into consideration the thickness of the metal to be processed into fin strips, i.e. .003 inch, the width of louver to be formed on the fin proper, i.e. .059 inch, and the angle of louver inclination from the central plane of the fin, i.e. 28°.

It was further decided to prepare a blade having a pitch diameter of 4.30 inches, a cutting edge width of .003 inch, and an uneven number of teeth. For the purpose intended it was further decided that it would be preferable to provide a blade having a tooth space angle of above about 100°. The term "tooth space angle" as used herein refers to the angle measured between the facing sides of two adjacent teeth of the blade formed by the intersection of lines drawn tangent to the tip arcs of the respective teeth and the root arc therebetween. This angle is illustrated in FIGURE 16 and there designated angle CC.

After selecting the above general requirements, a layout compatible therewith was prepared on a scale 20 times size in accordance with conventional gear designing practice. The tooth height and the number of teeth to be used were estimated taking into account the aforementioned general requirements. The term "tooth height" as employed herein refers to the shortest distance from the root circle to the locus of the tip arc radius. In other words "tooth height" herein does not include the height of the tip but rather refers to the shortest distance from the root circle to the tip circle minus the tooth tip radius. In this case a tooth number of 17 and a tooth height of .330 inch were chosen.

The following calculations were then made to determine whether or not a blade could be cut using the aforementioned dimensions that would provide a tooth space angle of 100° or more and developed half tooth length of .545 inch so as to correspond to the chosen developed fin length.

Referring now to FIGURES 9–55 inclusive and to the following calculations, the following identifying letters represent the previously chosen measurements:

| | | |
|---|---|---|
| B—.330 inch | | Tooth height. |
| D—.020 inch | | Tooth tip radius which corresponds to fin fold radius. |
| K—.003 inch | | Fin strip thickness. |
| L—.059 inch | | Louver width. |
| M—28° | | Louver angle. |
| N—.003 inch | | Cutting edge width. |

The remaining letters in the calculations and shown in FIGURES 9–55 inclusive identify the measurements derived in the following calculations:

*Calculations.*—(*All measurements not otherwise indicated are in inches*).

Figure 9:
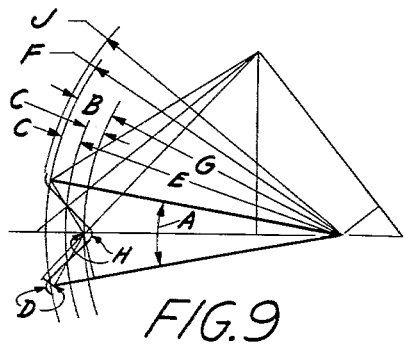

Series I—Refer to FIGURE 9

1. Divide a circle representing the intended blade by the number of teeth intended $$\frac{360°}{17} = 21°10'35.29'' = A = \text{Pitch Angle}$$

2. Divide the selected Tooth Height by 2.

$$\frac{.330}{2} = .165 = C = \text{Addendum or 1/2 Tooth Height}$$

3. Divide the selected Pitch Diameter by 2.

$$\frac{4.300}{2} = 2.150 = E = \text{Pitch Radius}$$

4. Add one half Tooth Height to Pitch Radius.

$$E + C = F$$
$$2.150 + .165 = 2.315 = F = \text{Radius of the Locus of Tip Tooth Radius.}$$

5. Subtract from Pitch Radius one half of Tooth Height.

$$2.150 - .165 = 1.985 = G = \text{Radius of the Locus of Root Arc Radius.}$$

6. Add Fin Strip Thickness to Tooth Tip Radius.

$$D + K = H$$
$$.020 + .003 = 0.23 = H = \text{Root Arc Radius}$$

7. Add $F$ to $D$.

$$2.315 + .020 = 2.335 = \text{“}J\text{”} = \text{Major Radius}$$

8. Major Radius $\times 2 = $ Outside diameter of blade.

Figure 10:
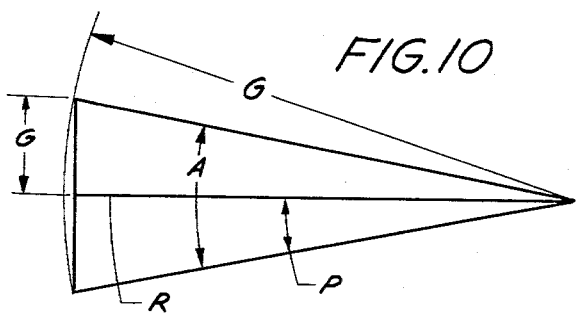
Figure 11:
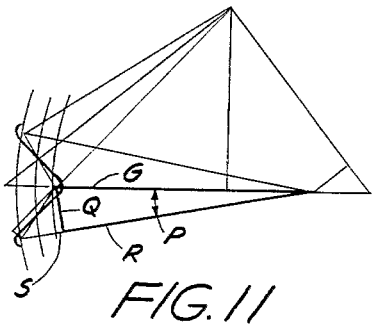

*Series II—Refer to FIGURES 10 and 11*

1. Divide Angle "$A$" by 2.

$$\frac{21°10'35.29''}{2} = 10°35'17.65'' = P$$

2. 
$$\frac{G + G \times \text{Cord Factor}}{2} = Q$$

From Table of Cord Factors 17 space = .18375

$$\frac{(1.985 + 1.985) \times .18375}{2} = .3647437 = Q$$

3. $R = \sqrt{G^2 - Q^2}$ $$1.985^2 = 3.940225 - .3647437^2 = .133037966$$
$$\sqrt{3.807187034} = 1.95119 = R$$

4. $G - R$ $$1.985 - 1.95119 = .03381 = S$$

Figure 12:
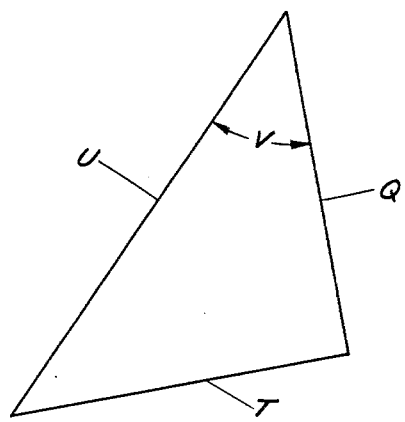
Figure 13:
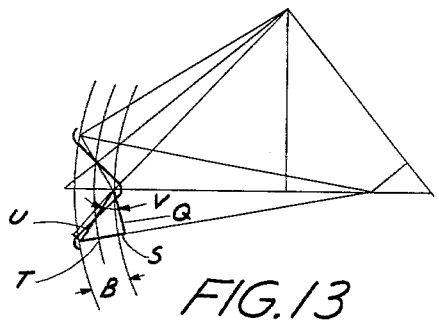

*Series III—Refer to FIGURES 12 and 13*

1. $B$ (given) $+ S$ of FIGURE 11 $= T$
$$.330 + .03381 = .36381 = T$$

2. $U = \sqrt{T^2 + Q^2}$ $$.36381^2 = .132357716$$
$$+ .647437_2 = .133037366$$
$$\sqrt{.265395082} = .515165 = U$$

3. $\frac{T}{U} = $ Sine of Angle $V$ $$\frac{.36381}{.515165} = .706200925 \approx 44°55'36'' = \text{Angle } V$$

*Series IV—Refer to FIGURES 14 and 15*

Tooth Tip Radius $D +$ Root Arc Radius $H = W$

1. $.020 + .023 = .043 = W$

2. $X = \sqrt{U^2 - W^2}$ $$.515165^2 = .265395682$$
$$- .043^2 = .001849$$
$$\sqrt{.263546682} = .513367 = X$$

3. $\frac{W}{U} = $ Sine of Angle $Y$ $$\frac{043}{.515164} = .0834684033 \approx 4°47'16.75'' = \text{Angle } Y$$

*Series V—Refer to FIGURE 16*

1. Angle $V$ of FIGURES 12 and 13 $+$ Angle $Y$ of FIGURES 14 and 15

$$44°55'36''$$
$$4°47'16.75''$$
$$\overline{49°42'52.75''} = \text{Angle } Z$$

2. Angle $Z$—Angle $P$ of FIGURES 10 and 11

$$49°42'52.75''$$
$$10°35'17.65''$$
$$\overline{39° 07'35.1''} = \text{Angle } AA$$

3. Determine Complement of Angle AA $$90° 0' 0''$$
$$39° 7'35.1''$$
$$\overline{50°52'24.9''} = \text{Angle } BB$$

4. Angle $BB \times 2 = $ Angle $CC$ $$50°52'24.9' \times 2 = 101°44'49.8'' = \text{Angle } CC = \text{Tooth Space Angle}$$

If the tooth space angle here derived is an angle of less than 100° the next step would be to subtract two teeth from the number of teeth selected and recalculate to this point. This procedure is followed until a tooth space angle of greater than 100° is achieved with the maximum number of teeth this will allow.

*Series VI—Refer to Figures 17 and 18*

Determination of Developed Length of Half-Tooth

1. Shortest distance between Root Arc and Tooth Tip Arc = Side X of FIGURES 14 and 15 or .513367.
2. Length of Tip Arc per 1° = Tooth Tip Radius $d +$ Fin Strip Thickness $\div 3 \times 2 \times \pi \div 360 \times$ the angle in degrees.

$$\frac{.020 + \frac{.003}{3} \times 2 \times 3.14159}{360} = .000366518833 = \text{Length of Arc per } 1° = DD \text{ (calculation item not illustrated)}$$

3. Angle $Z$ of FIGURE 16 $+$ Angle $AA$ of FIGURE 16

$$49°42'52.75'' \qquad 88°50'27.85'' = \frac{88\ 3027.85°}{3600} =$$
$$39° 7'35.1''$$
$$\overline{88°50'27.85''} \qquad 88.84106944° = EE$$

(calculation item not illustrated)

4. $EE \times DD = $ Length of $\frac{\text{Tip Arc} + \text{Root Arc}}{2} = FF$ $$88.84106944° \times .000366518833 = .032561 = FF$$

(calculation item not illustrated)

5. Length of Side $X +$ Length of $FF = $ Developed Length
Length of Side $X = .513367$
Length of $FF\ \ \ = .032561$
$\overline{\ \ \ \ \ \ \ \ \ \ \ \ .545928}$ Developed Length of Fin and Half-Tooth.

If the calculated developed length is the same as the selected developed length, continue layout and calculations. If the calculated developed length is short, add to the selected tooth height (.330) and recalculate. If the developed length is long, substract from the selected tooth height and recalculate.

*Series VII—Refer to FIGURES 19 and 20*

Involute Radius and Locus Thereof

1. 
$$\frac{(E + E)\ \ \text{Cord\ \ Factor}}{2} = GG$$

17 spaces $\times 2 = 34$ spaces
34 space cord factor $= .09227$ $$\frac{(2.150 + 2.150) \times .09227}{2} = .1983805 = GG$$

2. $HH = \sqrt{E^2 - GG^2}$ $$2.150^2 = 4.6225 - .1983805 = .03935482$$
$$\sqrt{4.58314518} = 2.14082 = HH$$

Series VIII—Refer to FIGURES 21 and 22

1. $II = HH$ of FIGURE 20 — $G$ of FIGURE 9
   $2.14082 - 1.985 = .15582 = II$

2. $JJ = \sqrt{II^2 + G^2}$
   $.15582^2 = .02427987$
   $.1983805^2 = .03935482$
   $\sqrt{.06363469} = .252258 = JJ$ 3. $\dfrac{II}{JJ} =$ Sine of Angle $KK$ $\dfrac{.15582}{.252258} = .617700925 \approx 28°8'55'' =$ Angle $KK$

Series IX—Refer to FIGURES 23 and 24

1. $LL = H - \dfrac{K}{2}$ $LL = .023 - \dfrac{.003}{2} = .0215$

2. $MM = \sqrt{LL^2 + JJ^2}$
   $.252258^2 = .06363409$
   $+ .0215^2 = .00046225$
   $\sqrt{.06409634} = .253172 = MM$ 3. $\dfrac{LL}{MM} =$ Sine Angle $NN$ $\dfrac{.0215}{.253172} = .0849225032 \approx 4°52'18'' =$ Angle $NN$

Series X—Refer to FIGURES 25 and 26

1. $F$ of FIGURE 9 $= 2.315$

2. $\dfrac{F + F \times \text{Cord Factor}}{2} = OO$ 17 space cord factor $= .18375$ $\dfrac{2.315 + 2.315 \times .18375}{2} = .42538125 = OO$ 3. $PP = \sqrt{F^2 - OO^2}$
   $2.315^2 = 5.359225 - .42538125^2 = .180949$
   $\sqrt{5.178276} = 2.27558 = PP$

Series XI—Refer to FIGURES 27 and 28

1. $QQ =$ Side $PP$ of FIGURES 25 and 26 — $HH$ of FIG-19 and 20.
   $2.27558 - 2.14082 = .13476$ 2. $RR = OO$ of FIGURES 25 and 26 — $GG$ of FIGURES 19 and 20.
   $.42538125 - .1983805 = .22700075 = RR$ 3. $SS = \sqrt{QQ^2 + RR^2}$
   $.13476^2 = .01816025 + .22700075^2 = .05152934$
   $\sqrt{.06968959} = .263988 = SS$ 4. $\dfrac{RR}{SS} =$ Sine of Angle $TT$ $\dfrac{.22700075}{.263988} = .859890411 \approx 59°18'16'' =$ Angle $TT$

Series XII—Refer to FIGURES 29 and 30

1. $LL$ of FIGURES 23 and 24 $= .0215$
2. $SS$ of FIGURES 27 and 28 $= .263988$
3. $UU = \sqrt{LL^2 + SS^2}$ $.0215^2 = .00046225 + .263988^2 = .06968959$
   $\sqrt{.07015184} = .264861 = UU$ (4) $\dfrac{LL}{UU} =$ Sine of Angle $VV$ $\dfrac{.0215}{.264861} = .0811746538 \approx 4°39'22'' =$ Angle $VV$

Figure 31:
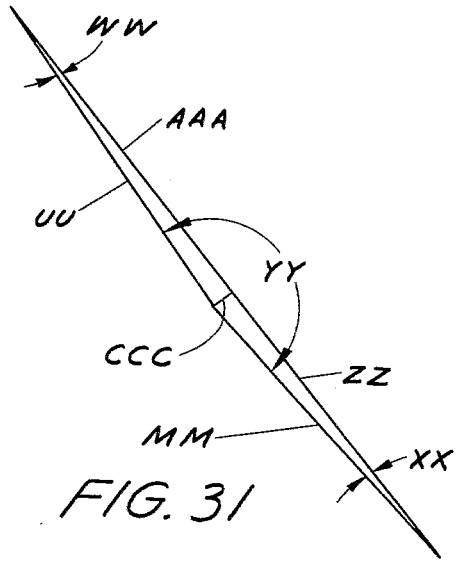
Figure 32:
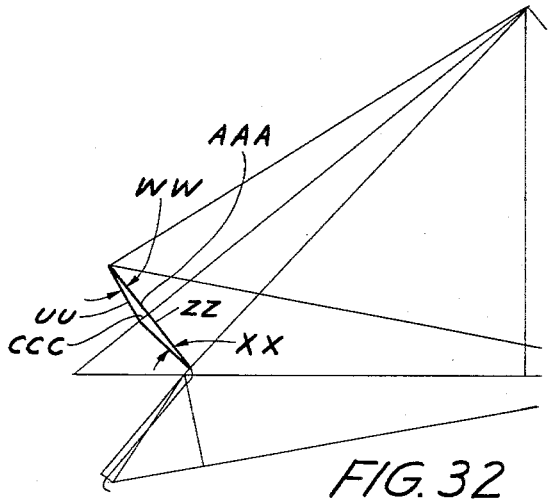

Series XIII—Refer to FIGURES 31 and 32

1. $MM$ of FIGURES 24 $= .253172$
2. $UU$ of FIGURES 29 and 30 $= .264861$
3. Angle $WW =$ Angle $TT$ of FIGURES 27 and 28 — Angle $VV$ of FIGURES 29 and 30 — Angle $BB$ of FIGURE 16.

$\begin{array}{r} 59°18'16'' \\ -\ 4°39'22'' \\ \hline 54°38'54'' \end{array}$ $\begin{array}{r} 54°38'54'' \\ -50°52'24.9'' \\ \hline 3°46'29.1'' = WW \end{array}$ 4. Angle $XX =$ Angle $KK$ of FIGURES 21 and 22 + Angle $NN$ of FIGURES 23 and 24 + Angle $BB$ of FIGURES 16 — 90°.

$\begin{array}{r} 38°\ 8'55'' \\ +\ 4°52'18'' \\ \hline 43°\ 1'13'' \end{array}$ $\begin{array}{r} 43°\ 1'13'' \\ +50°52'24.9'' \\ \hline 93°53'37.9'' \end{array}$ $\begin{array}{r} 93°53'37.9'' \\ -90°\ 0'\ 0'' \\ \hline 3°53'37.9'' = \text{Angle } XX \end{array}$ 5. Angle $YY = 180°$ — Angle $WW$ — Angle $XX$ $\begin{array}{r} 180°\ 0'\ 0'' \\ -\ 3°46'29.1'' \\ \hline 176°13'30.9'' \end{array}$ $\begin{array}{r} 176°13'30.9'' \\ -\ 3°53'37.9'' \\ \hline 172°19'53'' = \text{Angle } YY \end{array}$ 6. $ZZ = MM \times \cos XX$
   $AAA = UU \times \cos WW$
   $BBB = ZZ + AAA$ $.253172 \times .9976915508 = .2525875651 = ZZ$
   $.264861 \times .9978303226 = .2642863370 = AAA$
   $\overline{.5168739021} = BBB$ 7. $CCC = \sqrt{MM^2 - ZZ^2}$ $.253172^2 = .064096061584$
   $- .252587^2 = .063800192569$
   $\sqrt{.000295869015} = .0172008 = CCC$

Figure 33:
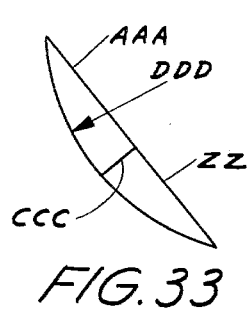
Figure 34:
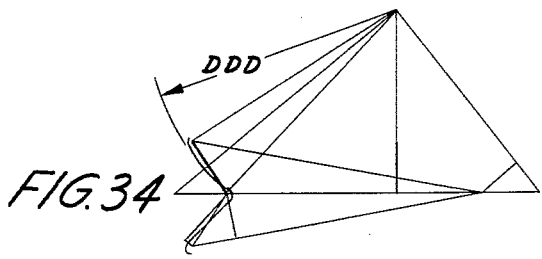

Series XIV—Refer to FIGURES 33 and 34

1. $DDD = \dfrac{\dfrac{ZZ \times AAA}{CCC} + CCC}{2}$ $ZZ$ from Series XIII $= .252587$
   $AAA$ from Series XIII $= .264286$
   $CCC$ from Series XIII $= .0172008$ $\dfrac{\dfrac{.252587 \times .264286}{.0172008} + .0172008}{2} = 1.949068415 = DDD$ $DDD =$ Tooth Involute Radius $= 1.949$

Figure 35:
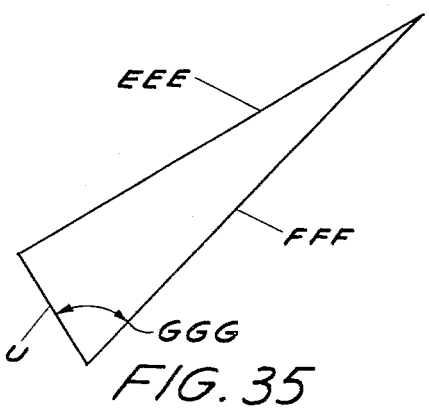
Figure 36:
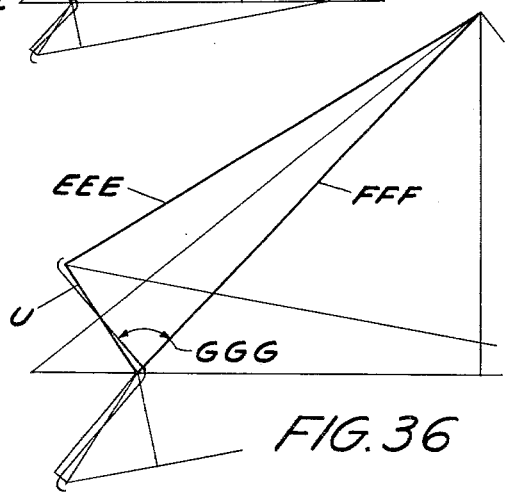

Series XV—Refer to FIGURES 35 and 36

1. $U$ of FIGURES 12 and 13 $= .515165$
2. $EEE = DDD$ of FIGURES 33 and 34 — $D$ of FIGURES 9 and 14.

$1.949 - .020 = 1.929 = EEE$

3. $FFF = DDD$ of FIGURES 33 and 34 + $H$ of FIGURES 9 and 14.

$1.949 + .023 = 1.972 = FFF$

4. $\dfrac{FFF^2 + U^2 - EEE^2}{2 \times FFF \times U} = \cos GGG$ $\begin{array}{r} 1.972^2\ \ = 3.888784 \\ +\ .515165^2 = .2653949772 \\ \hline 4.1541789772 \end{array}$ $2 \times 1.972 \times .515165 = 2.03181076$
   $.4331379772$ $\dfrac{.4331379772}{2.03181076} = .2131783066 \approx 77°41'29'' =$ Angle $GGG$

Series XVI—Refer to FIGURES 37 and 38

1. $FFF$ of FIGURES 35 and 36 = 1.972
2. Angle $HHH$ = 180° − Angle $BB$ of FIG. 16
   + Angle $Y$ of FIGS. 14 and 15
   + Angle $GGG$ of FIGS. 35 and 36

$\quad$ 50°52′24.9″
   $\quad$ 4°47′16.75″ $\qquad$ 180° 0′ 0″
   $\quad$ 77°41′29″ $\qquad\;$ −133°21′10.65″
   $\quad$ ─────────── $\quad$ ───────────
   $\quad$ 133°21′10.65″ $\quad\;$ 46°38′49.35″ = $HHH$ 3. $III = FFF \times \text{Sine } HHH$ $\quad 1.972 \times .7271385456 = 1.4339172119 = III$ 4. $JJJ = \sqrt{FFF^2 - III^2}$ $\quad 1.972^2 = 3.888784$
   $\quad -1.4339172199^2 = 2.0561.8568$
   $\quad \sqrt{1.832665432} = 1.35375 = JJJ$

Series XVII—Refer to FIGURES 39 and 40

1. Angle $BB$ of FIGURE 16 = 50°52′24.9″
2. $III$ of FIGURES 37 and 38 = 1.4339172119
3. $KKK = \dfrac{III}{\cos BB}$ $\quad \dfrac{1.4339172119}{.6310335425} = 2.2759378 = KKK$ 4. $LLL = \sqrt{KKK^2 - III^2}$ $\quad 2.27593789^2 = 5.179893279$
   $\quad -1.4339172119^2 = 2.056118568$
   $\quad \sqrt{3.123774711} = 1.76742 = LLL$

Series XVIII—Refer to FIGURES 41 and 42

1. $III$ of FIGURES 37 and 38 = 1.4339172119
2. Angle $BB$ of FIGURE 16 = 50°52′24.9″
3. $MMM = \dfrac{III}{\text{Sine } BB}$ $\quad \dfrac{1.4339172119}{.7757555464} = 1.84841374 = MMM$ 4. $NNN = \sqrt{MMM^2 - III^2}$ $\quad 1.84841374^2 = 3.416633354$
   $\quad -1.433917211^2 = 2.056118568$
   $\quad \sqrt{1.360514786} = 1.1664 = NNN$

Series XIX—Refer to FIGURES 43 and 44

1. Angle $BB$ of FIGURE 16 = 50°52′24.9″
2. $OOO = JJJ$ of FIGURES 37 and 38 + $NNN$ of FIGURES 41 and 42 − $G$ of FIGURE 9.

$\quad 1.35375 + 1.1664 - 1.985 = .53515 = OOO$

3. $PPP = OOO \times \text{Sine } BB$ $\quad .53515 \times .7757555464 = .4151455807 = PPP$ = Locus of tooth involute radius below center line of blade with tooth space rotated to Angle $AAA$ from Series XIII 4. $QQQ = \sqrt{OOO^2 - PPP^2}$ $\quad .53515^2 = .2863855225$
   $\quad -.4151455807^2 = .1723458531$
   $\quad \sqrt{.1140396694} = .337697 = QQQ$

Figure 45:
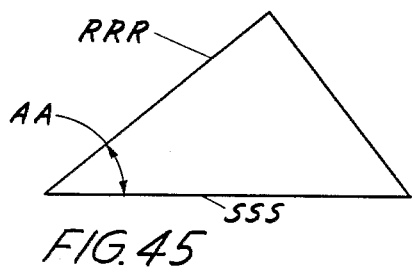
Figure 46:
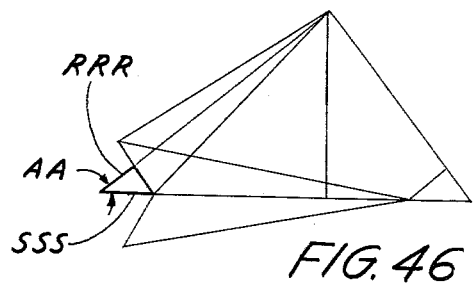

Series XX—Refer to FIGURES 45 and 46

1. $RRR = KKK$ of FIGURES 39 and 40 − $DDD$ of FIGURES 33 and 34.

$\quad 2.2759378 - 1.949 = .3269378$

2. $SSS = LLL$ of FIGURES 39 and 40 − $JJJ$ of FIGURES 37 and 38.

$\quad 1.76742 - 1.35375 = .41377 = SSS = ½$ checking roll diameter

3. Angle $AA$ of FIGURE 16 = 39°7′35.1″

Figure 47:
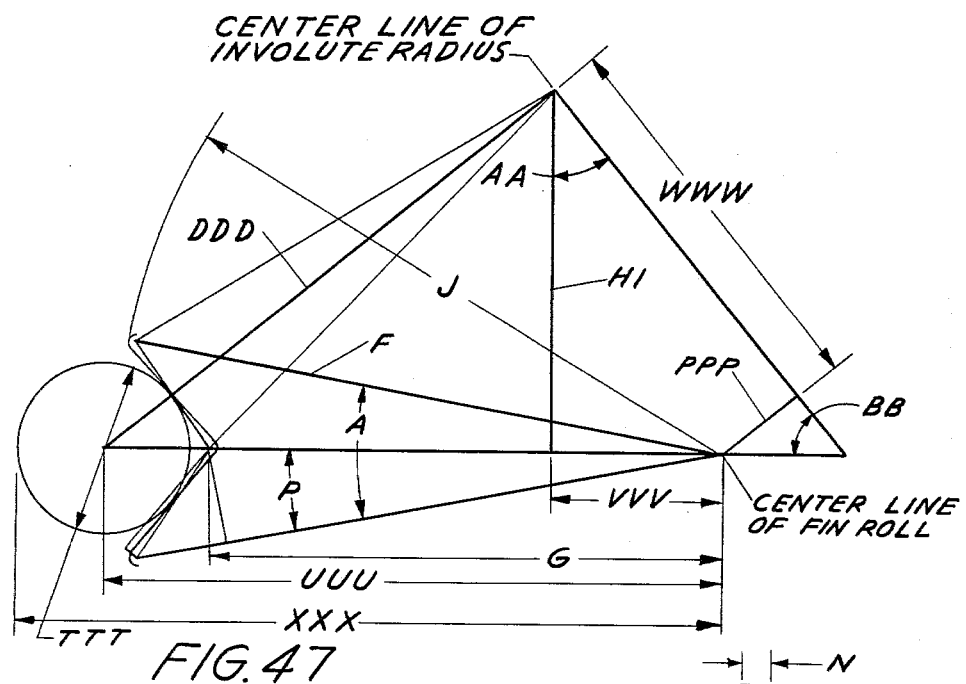

Series XXI—Refer to FIGURE 47

1. $TTT$ = Roll Diameter = $RRR$ of FIGURES 45 and 46 × 2 = .6538
2. $UUU$ = Center line of roll to center line fin roll = $G$ of FIGURE 9 + $SSS$ of FIGURES 45 and 46

$\quad 1.985 + .41377 = 2.3988$

3. $G$ of FIGURE 9 = 1.985
4. $VVV = NNN$ of FIGURES 41 and 42 − $OOO$ of FIGURES 43 and 44

$\quad 1.1664 - .53515 = .6313 = VVV$

5. $III$ of FIGURES 37 and 38 = 1.4339
6. $PPP$ of FIGURES 43 and 44 = .4151
7. $WWW = MMM$ of FIGURES 41 and 42 − $QQQ$ of FIGURES 43 and 44

$\quad 1.84841374 - .337697 = 1.5107 = WWW$

Figure 48:
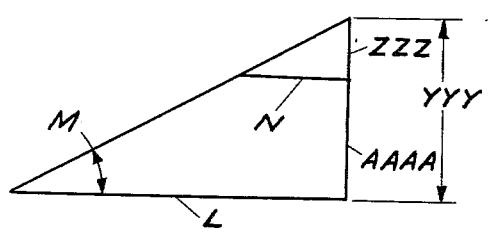

Center of fin blade to center line of tooth involute radius taken in a horizontal direction (ref. FIG. 48) with the tooth space rotated to angle AA from Series V.

8. $XXX = UUU + RRR$ of FIGURES 45 and 46
   $\quad 2.3988 + .3269 = 2.7257 = XXX$ = Distance over check roll to center line of fin roll.
9. $F$ of FIGURE 9 = 2.315
10. $J$ of FIGURE 9 = 2.335
11. $DDD$ of FIGURES 33 and 34 = 1.949 = Tooth Involute Radius
12. $A$ of FIGURE 9 = 21°10′35.29″ = Tooth Pitch Angle
13. $P$ of FIGURES 10 and 11 = 10°35′17.65″
14. $BB$ of FIGURE 16 = 50°52′24.9″
15. $AA$ of FIGURE 16 = 39°7′35.1″ = Angle of blade rotation to tooth involute radius center line

Figure 49:
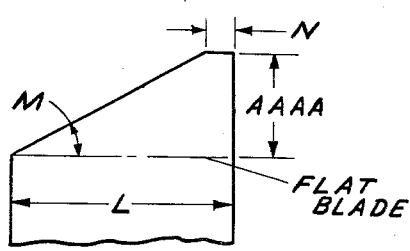

Series XXII—Refer to FIGURES 48, 49 and 50

1. Angle $M$ (given) = 28°
2. $L$ (given) = .059
3. $YYY = L \times \tan M$ $\quad .059 \times .5317094317 = .0313708564 = YYY$ 4. $N$ (given) = .003
5. $ZZZ = N \times \tan M$ $\quad .003 \times .5317094317 = .0015951282 = ZZZ$

6. $AAAA = YYY - ZZZ$ $\quad .0313708564 - .0015951282 = .0297757282 = AAAA$

7. $BBBB = AAAA + DDD$ from Series XIV
   $\quad .0298 + 1.949 = 1.9788 = BBBB$ = Louver Cutting Edge Radius

Series XXIII—Refer to FIGURES 51, 52, 53 and 54

1. $BBBB$ of FIGURE 50 = 1.9788
2. $CCCC = 2.000$
3. $DDDD = BBBB - \left[\dfrac{1}{2}\sqrt{4BBBB^2 - CCCC^2}\right]$ $\quad 1.9788 - \dfrac{\sqrt{4 \times 1.9788 \times 1.9788 - (2 \times 2)}}{2} = .27128 = DDDD$ 4. $EEEE = DDDD \times \cos M$
   $\quad .2718 \times .8829475928 = .2395260229 = EEEE$
5. $FFFF = ½ CCCC = 1.000$
   $GGGG = ½ CCCC = 1.000$
6. $HHHH = \dfrac{1}{2}\left[\dfrac{FFFF \times GGGG}{EEEE} + EEEE\right]$ = Back off Radius $\dfrac{1}{2}\left[\dfrac{1}{.2395260229} + .2394260229\right] = 2.2072188 =$ $\qquad HHHH$ = Louver Back off Radius

Series XXIV—Refer to FIGURE 56
TEST OF CALCULATIONS (1) Two layouts of fin rolls ten times size with at least two teeth showing were prepared.

(2) Equally spaced lines on the pitch circle of each layout were marked off. Starting at the center line of the tooth on one layout and the center line of the tooth space on the other layout each line from center line out was numbered.

(3) Both layouts were secured at their center lines so that the pitch circles and tooth forms matched.

(4) The two layouts were rotated with the numbered lines matched.

(5) The tooth forms were observed in rotation upon each other to check interference. If adjustments are necessary, check calculations for error. Then, if necessary, make minor adjustments in root radius clearance in accordance with conventional gear cutting techniques.

(6) The blade was then cut in accordance with the above calculations and chosen requirements.

A pair of roll dies were assembled with each comprising 21 gear-like blades or sections arranged as in FIGURE 5. The cutting and forming blades were prepared in accordance with the procedure aforedescribed in relation to FIGURES 9 through 55 inclusive with the exception that the louver-forming involute faces of the teeth were cut to provide a louver angle of 35°. The central and terminal sections were prepared in like manner except that all working surfaces were made parallel to the transverse axis of their respective blades.

Fin strips of the configuration illustrated in FIGURE 2 were prepared using these roll dies and were tested for cooling efficiency in an automobile radiator under operating conditions hereinafter described.

The performance of the structure was compared with a commercially used slit fin structure of equal external dimensions and total surface area. The comparison fin provided two terminal louvers, six intermediate louvers, and a central support bearing two central louvers. The fins of the comparison fin strip prepared on conventional roll dies bearing essentially straight faced essentially triangular teeth were somewhat curved in general outline and of generally uneven surface. All louvers of the comparison fin extended from the main body of the fin for essentially the same distance in contrast to the configuration of the planar fins of this invention.

Tests were conducted using the fin strips of this invention and the comparison fin strips in automobile radiators otherwise constructed alike. The tests were conducted on a 5-mile circular track with an automobile having an 8-cylinder, 221 cubic inch displacement, gasoline engine. Tests were made at road speeds of 60, 75 and 90 miles per hour. Both fin strips were tested using a 14 fin per inch ratio and the cooling efficiency of each recorded. The cooling efficiency of the planar fin of this invention proved to be higher than that of the control at each speed tested as measured by air-to-boil temperature. Air-to-boil temperature, a conventional measure of cooling systems, measures the ambient air temperature at which the liquid medium, in this example water, will boil.

These results were confirmed by other tests in which the vehicle was connected to a suitable dynamometer to simulate defined road grades by pulling a measured load. Tests were made at 30 miles per hour with a 7% grade, at 45 miles per hour with a 5% grade and at 60 miles per hour with a 4% grade. The fin of this invention again demonstrated significantly higher cooling efficiency than the comparison fin.

In both series of tests the degree of superiority demonstrated by the fin of this invention was most pronounced at the higher speeds, i.e. at the more severe conditions.

EXAMPLE 2

The testing procedure of Example 1 was repeated but with the following differences:

(1) The vehicle employed for the tests was equipped with an 8-cylinder, 260 cubic inch displacement, gasoline engine.

(2) The fin of this invention was tested using a 14 fin per inch ratio while 15 fin per inch ratio was used for the comparison fin.

The fin of this invention demonstrated a higher cooling efficiency than the comparison fin in the simulated grade tests.

EXAMPLE 3

In standard wind tunnel tests simulating the conditions of Example 1 and using an 8-cylinder, 260 cubic inch displacement gasoline engine, the cooling efficiency of the fin of the invention was found to be essentially equal to that of the comparison fin when a 15 fin per inch ratio was employed for the comparison fin and only a 13 fin per inch ratio for the fin of this invention.

EXAMPLE 4

The testing procedure of Example 1 was repeated but with the following differences:

(1) The vehicle employed was equipped with an 8-cylinder, 352 cubic inch displacement, gasoline engine.

(2) The fin strip of this invention here used was a 1.27 inch copper strip of the design shown in FIGURE 2 and was employed at the rate of 13 fins per running inch.

(3) The comparison fin was a copper strip 1.95 inches wide and of the design used in Example 1 except that each fin included three louvered windows separated by two internal supports similar to the central support in the two window fins.

The results of these tests are set forth in the following table:

*Table I*

COMPARATIVE COOLING TESTS AS MEASURED BY AIR-TO-BOIL TEMPERATURES

| Test | 1.27″ Planar Fin | 1.95″ Comparison Fin |
| --- | --- | --- |
| 30 m.p.h.—7% grade | 119° | 116° |
| 45 m.p.h.—5% grade | 124° | 121° |
| 60 m.p.h.—4% grade | 128° | 126° |

Thus, even with a surface area smaller than that of the comparison fin by a ratio of about 16.5 to 23.4 the planar fin displayed a cooling efficiency substantially equal to the larger fin strip.

Having thus described the invention with particularity, it is obvious that modifications can be made in the same without departing from the spirit and scope of the invention as set forth in the appended claims.

We claim:

1. A circular, plate-like section of a sectional roll die adapted for making regularly spaced impressions upon a sheet material in cooperation with a mated roll die, said section comprising a gear-like blade having evenly spaced teeth about the perimeter thereof, each of said teeth having a tip and a pair of curved transversely extending face surfaces separated by said tip, each of said face surfaces being separated from the nearest face surface of the nearest companion tooth of said blade by a concave surface, each of said face surfaces sloping transversely.

2. A circular, plate-like section of a sectional roll die adapted for making regularly spaced impressions upon a sheet material in cooperation with a mated roll die, said section comprising a gear-like blade having evenly spaced teeth about the perimeter thereof, each of said teeth having a convex tip and a pair of curved and transversely extending face surfaces of equal length separated by said tip, each of said face surfaces being separated from the nearest face surface of the nearest companion tooth of said blade by a concave surface, each of said face surfaces sloping transversely across a major portion of its width, the sloping portions of the face surfaces of a given tooth being in parallel relationship with each other at any given heighth of the tooth.

3. A circular, plate-like section of a sectional roll die adapted for making regularly spaced impressions upon a sheet material in cooperation with a mated roll die, said section comprising a gear-like blade having evenly spaced teeth about the perimeter thereof, each of said teeth having a tip portion and a body portion provided with a pair of transversely extending face surfaces separated by said tip portion, each of said teeth in profile describing a tip arc portion and a pair of face arcs each of which comprises a segment of an involute of a noncircular evolute, each of said face arcs being separated from the nearest face arc of the nearest companion tooth by a clearance arc, each of said face surfaces sloping transversely across a major portion of its width, the sloping portions of the face surfaces of a given tooth being in parallel relationship with each other at any given heighth of the tooth.

4. A circular, plate-like section of a sectional roll die adapted for making regularly spaced impressions upon a sheet material in cooperation with a mated roll die, said section comprising a gear-like blade having evenly spaced teeth about the perimeter thereof, each of said teeth having a convex tip and a body portion provided with a pair of transversely extending face surfaces separated by said tip each of said teeth in profile describing a tip arc having a first radius of curvature and a pair of face arcs having a second and greater radius of curvature, each of said face arcs being separated from said tip arc by a line segment of configuration that differs from the curvature of said tip arc and from the curvature of said face arcs, each of said face arcs being separated from the nearest face arc of the nearest companion tooth of the blade by a clearance arc having a radius of curvature intermediate to said first radius and said second radius, each of said face surfaces sloping transversely across a major portion of its width.

5. A circular, plate-like section of a sectional roll die adapted for making regularly spaced impressions upon a sheet material in cooperation with a mated roll die, said section comprising a gear-like blade having evenly spaced teeth about the perimeter thereof, each of said teeth having a tip portion and a body portion provided with a pair of transversely extending face surfaces separated by said tip portion, each of said teeth in profile describing a tip arc having a first radius of curvature and a pair of face arcs having a second radius of curvature, each of said face arcs being separated from said tip arc by an essentially straight line segment, each of said face arcs being separated from the nearest face arc of the nearest companion tooth of the blade by a clearance arc having a third radius of curvature, said second radius being significantly greater than said first radius with said third radius being intermediate with respect to said first radius and said second radius, each of said face surfaces sloping transversely across a major portion of its width, the sloping portions of the face surfaces of a given tooth being in parallel relationship with each other at any given heighth of the tooth.

6. A circular, plate-like section of a sectional roll die adapted for making regularly spaced impressions upon a sheet material in cooperation with a mated roll die, said section comprising a gear-like blade having evenly spaced teeth about the perimeter thereof, each of said teeth having a tip portion and a body portion provided with a pair of transversely extending face surfaces separated by said tip portion, each of said teeth in profile describing a tip arc having a first radius of curvature and a pair of face arcs of equal length and having a second radius of curvature, each of said face arcs being separated from the nearest face arc of the nearest companion tooth of the blade by a clearance arc having a third radius of curvature, said second radius being substantially greater than said first radius, said third radius being greater than said first radius and lesser than said second radius, each of said face surfaces sloping tranversely throughout its length at a constant rate and for a predetermined distance across a major portion of its width.

7. A cutting and forming device for making regularly spaced impressions upon a sheet material, said device comprising a first, gear-like die assembly and a second gear-like die assembly spaced apart from said first assembly and adapted to rotate in operational mesh with said first die assembly when a sheet material is interposed therebetween; said first assembly comprising a first, gear-like blade mounted on a first shaft, said first blade having evenly spaced teeth about the perimeter thereof, each of said teeth having a tip portion and a body portion having a pair of transversely extending face surfaces separated by said tip portion, each of said face surfaces being separated from the nearest face surface of the nearest companion tooth of the blade by a concave surface, each of said teeth in profile describing a tip arc having a first radius of curvature and a pair of face arcs separated by said tip arc and having a second radius of curvature, each of said face arcs being separated from the nearest face arc of the nearest companion tooth of said blade by a clearance arc having a third radius of curvature, each of said face surfaces sloping transversely across a major portion of its width, and at least one other tooth-bearing blade of even profile with said first blade mounted on said first shaft in side-by-side relationship with and abutting said first blade with the teeth of said other blade in profile alignment with the teeth of said first blade, the abutting side of each tooth of said other blade extending beyond the abutting side of each tooth of said first blade; said second assembly comprising a mating, gear-like blade mounted on a second shaft and constructed and arranged to make edge-to-edge transverse working contact with the transversely extending surfaces of said first blade of said first assembly upon said sheet material and to provide a scissor-like cutting action with said other blade of said first assembly when said assemblies are rotated.

8. A cutting and forming device for making regularly spaced impressions upon a sheet material, said device comprising a first, gear-like die assembly and a second, gear-like assembly spaced apart from said first assembly and adapted to rotate in operational mesh with said first die assembly when a sheet material is interposed therebetween; said first assembly comprising a first, gear-like blade mounted on a first shaft, said first blade having evenly spaced teeth about the perimeter thereof, each of said teeth having a convex tip portion and a body portion having a pair of transversely extending face surfaces separated by said tip portion, each of said face surfaces being separated from the nearest face surfaces of the nearest companion tooth of the blade by a concave surface, each of said teeth in profile describing a tip arc having a first radius of curvature and a pair of face arcs separated by said tip arc and having a second radius of curvature, each of said face arcs being separated from the nearest face arc of the nearest companion tooth of said blade by a clearance arc having a third radius of curvature, each of said face surfaces sloping transversely across a major portion of its width, the sloping portions of the face surfaces of a given tooth of said blade being in parallel relationship with each other at any given heighth of the tooth, and at least one other tooth-bearing blade of even profile with said first blade mounted on said first shaft in side-by-side relationship with and abutting said first blade with the teeth of said other blade in profile alignment with the teeth of said first blade, the abutting side of each tooth of said other blade extending beyond the abutting side of each tooth of said first blade along the full length of the receding edge of its corresponding face surface; said second assembly comprising a mating, gear-like blade fixedly mounted on a second shaft and constructed and arranged to make edge-to-edge transverse working contact with the transversely extending surfaces of said first blade of said first assembly upon said sheet material and to provide a scissor-like cutting action with said other blade of said first assembly when said assemblies are rotated.

9. A cutting and forming device for making regularly spaced impressions upon a sheet material, said device comprising a first, gear-like, die assembly and a mating and second, gear-like die assembly spaced apart from said first die assembly a predetermined distance and adapted to rotate in operational mesh with said first die assembly when a sheet material of a thickness substantially equal to said distance is interposed therebetween; said first assembly comprising a series of circular, plate-like blades of even profile fixedly mounted on a first shaft in parallel relationship with each other with each in side-to-side contact with at least one adjacent member of said series, each of said blades having evenly spaced teeth encompassing the perimeter thereof, each of said teeth having a convex tip portion and a body portion having a pair of transversely extending face surfaces separated by said tip portion, each of said face surfaces being separated from the nearest face surface of the nearest companion tooth of the blade by a concave surface, each of said teeth in profile describing a tip arc having a first radius of curvature and a pair of face arcs separated by said tip arc and having a second radius of curvature, each of said face arcs being separated from the nearest face arc of the nearest companion tooth of said blade by a clearance arc having a third radius of curvature, the face surfaces of the teeth of a plurality of the blades of said first die assembly having a cutting edge of predetermined width with the remainder of the transversely extending surface sloping from said cutting edge to the receding opposite edge throughout the length thereof, the sloping portions of the face surfaces of a given tooth of said first die assembly being in parallel relationship with each other at any given heighth of the tooth, said second die assembly comprising a series of mating blades of even profile fixedly mounted on a second shaft and positioned and aligned to make edge-to-edge transverse working contact with the face surfaces of the correspondingly positioned blades of said first die assembly with a plurality of said mating blades each providing scissor-like cutting action with a blade of said first assembly adjacent and abutting the blade of said first assembly with which the mating blade makes edge-to-edge transverse working contact when said sheet material is interposed therebetween and the assemblies are rotated.

References Cited by the Examiner

UNITED STATES PATENTS

| | | | |
|---|---|---|---|
| 2,044,952 | 6/36 | Neveu | 165—151 |
| 2,138,625 | 11/38 | Colby | 153—68 |
| 2,443,377 | 6/48 | Daniel | 153—2 |
| 2,916,072 | 12/59 | Hallam | 153—2 |
| 2,999,525 | 9/61 | Mercer | 153—2 |
| 3,027,142 | 3/62 | Albers et al. | 165—151 |

FOREIGN PATENTS 12,028    6/92    Great Britain.

CHARLES W. LANHAM, *Primary Examiner.*

CHARLES SUKALO, MICHAEL V. BRINDISI,
*Examiners.*